United States Patent [19]

Matsushita et al.

[11] Patent Number: 5,689,145
[45] Date of Patent: Nov. 18, 1997

[54] STATOR STRUCTURE THAT REMOVES METAL PARTICLES FROM THE STATOR STRUCTURE

[75] Inventors: Kunitake Matsushita, Toyohashi; Takayuki Yamawaki, Kakegawa; Hideki Matsuura, Iwata; Hiroshi Sano, Iwata-gun, all of Japan

[73] Assignee: Minebea Co., Ltd., Nagano, Japan

[21] Appl. No.: 497,979

[22] Filed: Jul. 3, 1995

[30] Foreign Application Priority Data

Jul. 1, 1994 [JP] Japan .................................. 6-173218

[51] Int. Cl.$^6$ .................................................. H02K 15/00
[52] U.S. Cl. .................................................. 310/42
[58] Field of Search ........................... 310/254, 42, 49 R

[56] References Cited

U.S. PATENT DOCUMENTS

| | | | |
|---|---|---|---|
| 4,349,957 | 9/1982 | Lundin | 29/596 |
| 4,364,169 | 12/1982 | Kawano et al. | 29/596 |
| 5,168,662 | 12/1992 | Nakamura et al. | 51/289 R |
| 5,187,400 | 2/1993 | Kurata | 310/49 R |

FOREIGN PATENT DOCUMENTS

| | | | |
|---|---|---|---|
| 0289043 | 11/1988 | European Pat. Off. | |
| 59-28869 | 2/1984 | Japan | |
| 4-058754 | 2/1992 | Japan | |

Primary Examiner—Thomas M. Dougherty
Assistant Examiner—Jonathan Link
Attorney, Agent, or Firm—Staas & Halsey

[57] ABSTRACT

An object of the present invention is to provide a novel stator structure in an electrical rotating machine which has a stator to one end of which an end plate provided with a bearing is fixedly mounted and a rotor rotatably supported by the bearing, in which unwanted metal particles produced during welding of the end plate to the stator are prevented from entering between the stator and the rotor.

Positioning protrusions 61 are formed extending axially from the one end of the stator and positioning apertures 71 are provided in the end plate 65 for corresponding to and engaging with the positioning protrusions 61. Also, welding projections to be melted by resistance welding are arranged as located substantially on straight lines respectively extending from the rotation shaft 67 across the positioning protrusions 61 and on the outer side of the positioning protrusions 61. The end plate 65 is joined to the one end of the stator by welding at welding points 14. Unwanted metal particles produced during the resistance welding are blocked by the positioning protrusions 61 and will hardly flow towards the rotor 63.

5 Claims, 5 Drawing Sheets

STATOR STRUCTURE THAT REMOVES METAL PARTICLES FROM THE STATOR STRUCTURE

BACKGROUND OF THE INVENTION

1. Field of the Invention

The present invention relates to an electrical rotating machine and more specifically, a stator structure in a stepping motor.

2. Description of the Prior Art

Stepping motors are widely used in OA machines, computer peripherals, and other industrial apparatuses and enjoy their major role in drive application. The stepping motors are classified into PM, VR, and HB types depending on the structure of their rotators. Each stepping motor includes a bearing mechanism for supporting the shaft of a rotor which rotates in a stator magnet assembly provided with a given number of coils.

FIG. 6 is an exploded perspective view of a conventional stepping motor. As shown, a stator assembly 51 is made of a cylindrical form having a bottom and its interior will be explained later in more detail. The stator assembly 51 has a terminal 53 provided at the side thereof. Leads are soldered to the terminal 53 for connection to an external circuit but are not shown. An annular body of the stator assembly 51 is composed of yokes 55 of a magnetic conductive metal. There are two rows of upper stator magnetic poles 57 and lower stator magnetic poles 59 projecting inwardly from the yoke 55. A plurality of positioning protrusions 61 are provided on the top of the stator assembly 51.

Denoted by 63 is a rotor which rotates in the stator assembly 51 as magnetized to have N and S poles. An end plate 65 is mounted to the top of the stator assembly 51. The end plate 65 has a bearing 69 provided in the center thereof for supporting a rotating shaft 67 of the rotor 63. There are positioning apertures 71 arranged about the bearing 69 in the end plate 65 to correspond to the positioning protrusions 61 of the stator assembly 51. Also, projections 73 to be melted by resistance welding are provided about the bearing 69 inwardly of the positioning apertures 71 as extending downwardly or towards the stator assembly 51. The projections 73 may be located between the positioning apertures 71. Denoted by 74 are alignment raised portions which extend downwardly from the end plate 65 to be fitted into a center or rotor 63 opening of the stator assembly 51 for centering the bearing 69.

FIG. 7 is a longitudinal cross sectional view of the conventional stepping motor. As shown in FIG. 7, there are upper stator coils 75 and lower stator coils 77. The stator assembly 51 is fabricated by coupling the two yokes 55 of a bowl shape in cross section having magnetic poles, one containing the upper stator coils 75 and the other containing the lower stator coils 77, in a set of molds loaded in an injection machine, and filling the yokes 55 with an amount of resin material. During injection of the resin material, the positioning protrusions 61 are simultaneously formed. Denoted by 79 are burrs remaining in an injection resin inlet of the molds. Also shown is a lower bearing 81 secured in a bottom resin 83. Motor mounting tubs 85 and anchoring slots 87 are shown in FIG. 6.

As shown in FIG. 7, the assembling of the stepping motor or electrical rotating machine starts with placing the end plate 65 on the stator assembly 51 so that the positioning protrusions 61 are accepted in the positioning apertures 71 of the end plate 65, and applying a pulse current to heat up the projections 73 while pressing the end plate 65 against the yokes 55. As the result of the resistance welding, the end plate 65 is securely joined at welding points 89 shown in FIG. 8 to the stator assembly 51. It is, however, likely to allow particles of metal produced during the resistance welding to enter between the end plate 65 and the yoke 55 and between the stator assembly 51 and the rotor 63. Upon energizing the electrical rotating machine, the metal particles between the end plate 65 and the yoke 55 start flowing due to resultant vibration. Some of the metal particles are attracted by the action of a magnetic force on the rotor 63, thus traveling deep into a small clearance between the rotor 63 and the stator assembly 51. This will interrupt the smooth rotation of the rotor 63 or create rotation noises. At worse, the rotor 63 may be jammed and stop.

SUMMARY OF THE INVENTION

It is an object of the present invention, for eliminating the above disadvantage, to provide a novel stator structure in an electrical rotating machine which has a stator to one end of which an end plate provided with a bearing is fixedly mounted and a rotor rotatably supported by the bearing, characterized in that particles of metal produced during welding of the end plate to the stator are prevented from entering between the stator and the rotor.

For achievement of the above object of the present invention, a stator structure in an electrical rotating machine which has a stator to one end of which an end plate provided with a bearing is fixedly mounted and a rotor rotatably supported by the bearing is provided in that positioning protrusions are formed extending axially from the one end of the stator, positioning apertures are provided in the end plate for corresponding to and engaging with the positioning protrusions, and welding points are determined for fixedly Joining the end plate to the one end of the stator by welding. In particular, the welding point is located substantially on a straight line extending from the center of rotation across the positioning protrusion and on the outer side of the positioning protrusion.

While the positioning protrusions are provided extending axially from the one end of the stator, the corresponding positioning apertures in which the positioning protrusions are accepted are arranged in the end plate. Also, the welding projections which are melted for coalescing by resistance welding are provided substantially on their respective straight line extending from the center of rotation across the positioning protrusions and on the outer side of the positioning protrusions respectively. Upon the welding projections being melted, the end plate is joined to the stator. As unwanted metal particles produced during the resistance welding are blocked by the positioning protrusions, they will hardly flow towards the rotor.

DESCRIPTION OF THE PREFERRED EMBODIMENTS

Figure 1:
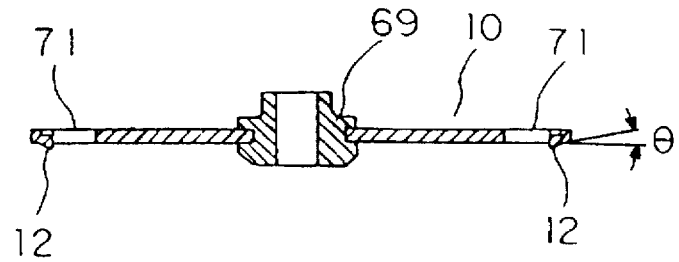
FIG. 1 is a cross sectional view of an end plate showing one embodiment of the present invention.
Figure 2:
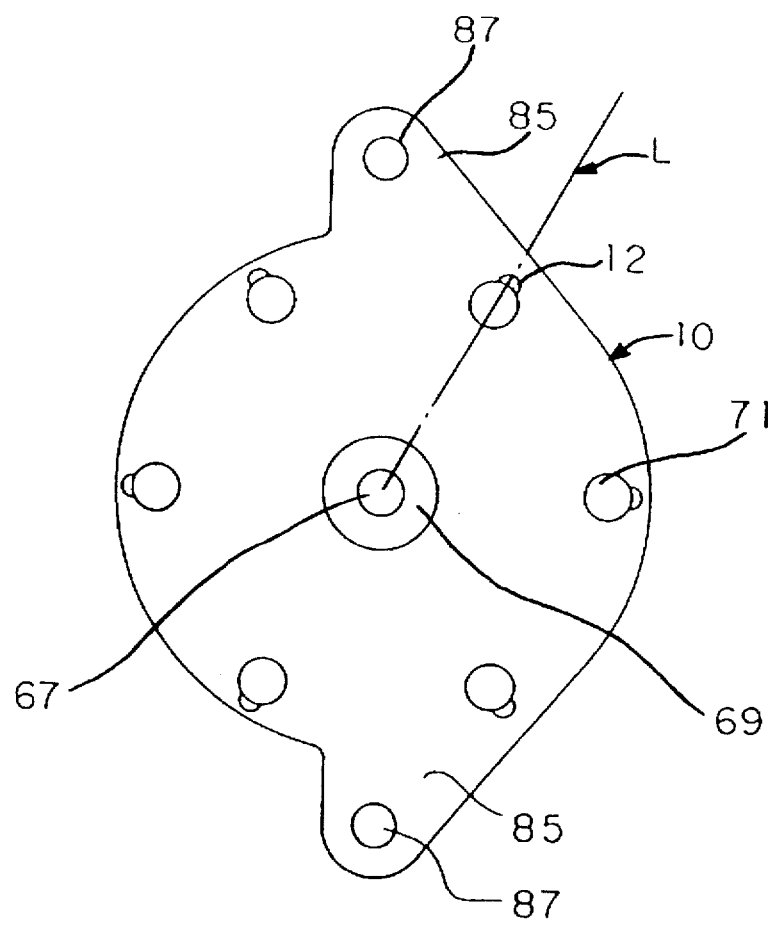
FIG. 2 is a front view of the end plate.

Embodiments of the present invention will be described in more detail referring to the accompanying drawings. FIG. 1 is a cross sectional view of an end plate of a stepping motor according to one embodiment of the present invention. FIG. 2 is a front view of the same. Like components are denoted by like numerals as described in the prior art and will be explained in no more detail. As shown, the endplate of the embodiment is denoted by 10. The end plate 10 has a bearing 69 provided in the center thereof for supporting a rotating shaft 67. The end plate 10 also has positioning apertures 71 provided therein about the rotating shaft 67, similar to those in the prior art.

The positioning apertures 71 are so located as to correspond to positioning protrusions 61 provided upwardly on the top of a stator assembly 51. Each of the positioning apertures 71 is associated with a welding projection 12 which is to be heated by resistance welding. The welding projection 12 is located on just the outer side of the positioning aperture 71 and on a straight line L extending from the center of the bearing 69, by which the rotating shaft 67 is supported, across the positioning aperture 71 in which the positioning protrusion 61 is accepted.

Figure 3:
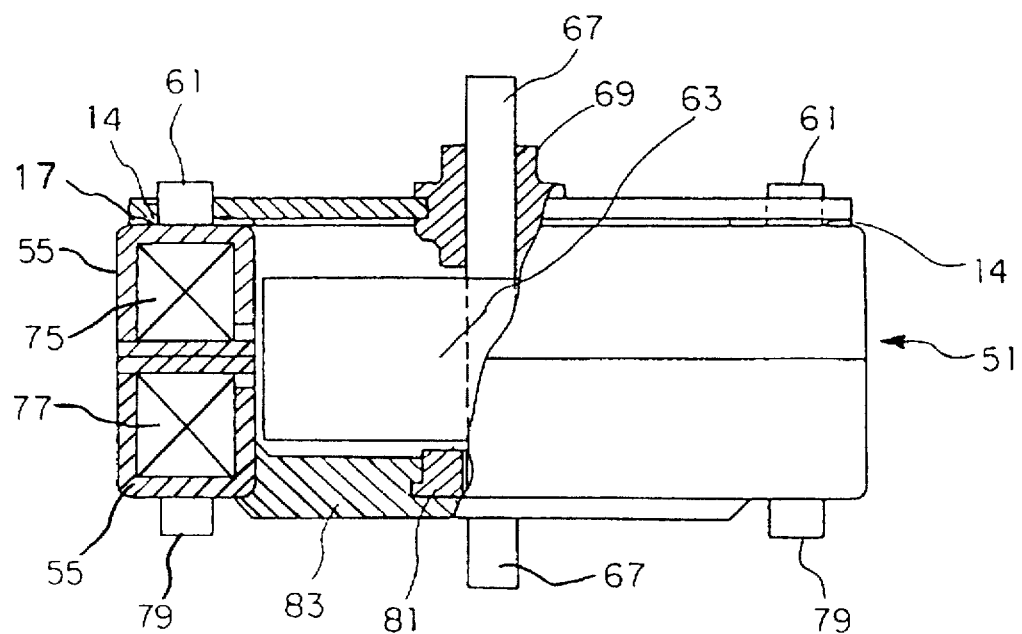
FIG. 3 is a cross sectional view of a stepping motor.

The end plate 10 is joined to the stator assembly 51 by placing the end plate 10 on the stator assembly 51 with its positioning apertures 71 accepting the positioning protrusions 61, and while pressing the end plate 10 against the yokes 55, applying a pulse current to heat up the welding projections 12 for coalescing. As the result of the resistance welding, the end plate 10 is securely joined at its welding points 14 shown in FIG. 3 to the top of the stator assembly 51. During the resistance welding, particles of metal may be produced and dispersed in all directions from the projections 12. A part of the metal particles which tends to flow towards the rotor 63 is blocked by the positioning protrusions 61 of the stator assembly 51. The remaining metal particles about the welding points 12 are also prevented from entering between the stator assembly 51 and the rotor 63. It is a good idea that surface regions of the end plate 10 just outside the projections 71 are slotted down at an angle θ as shown in FIG. 1 so that the metal particles are removed outwardly along the slots 17 as shown in FIG. 3.

Figure 4:
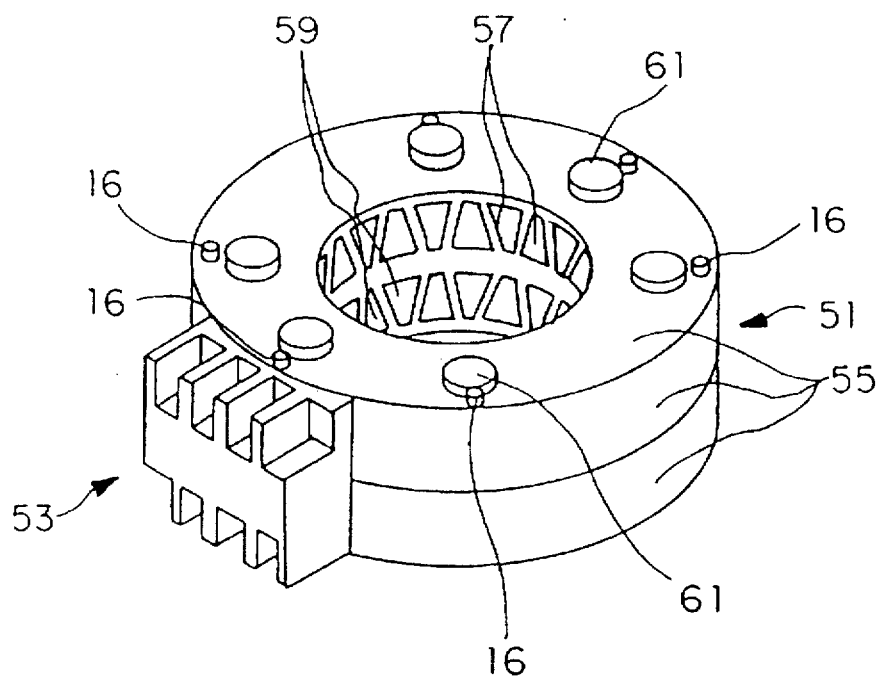
FIG. 4 is a perspective view showing another embodiment of the present invention.

The welding projections 12 of the previous embodiment are formed on the end plate 10. In another embodiment, welding projections 16 are provided on the upper yoke 55 of the stator assembly 51 as shown in FIG. 4. Each projection 16 is located outwardly of the positioning protrusion 61 and on a straight line extending from the center of the rotating shaft opening across the positioning protrusion 61.

Figure 5:
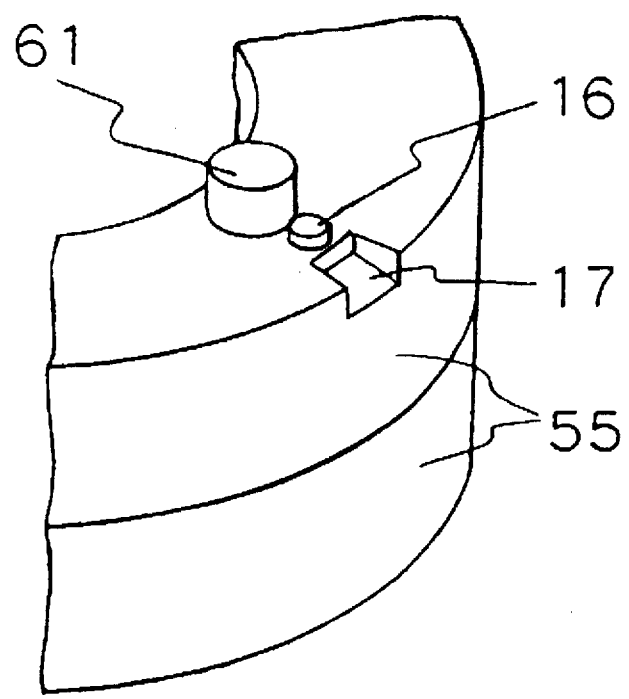
FIG. 5 is a perspective view showing next another embodiment of the present invention.
Figure 6:
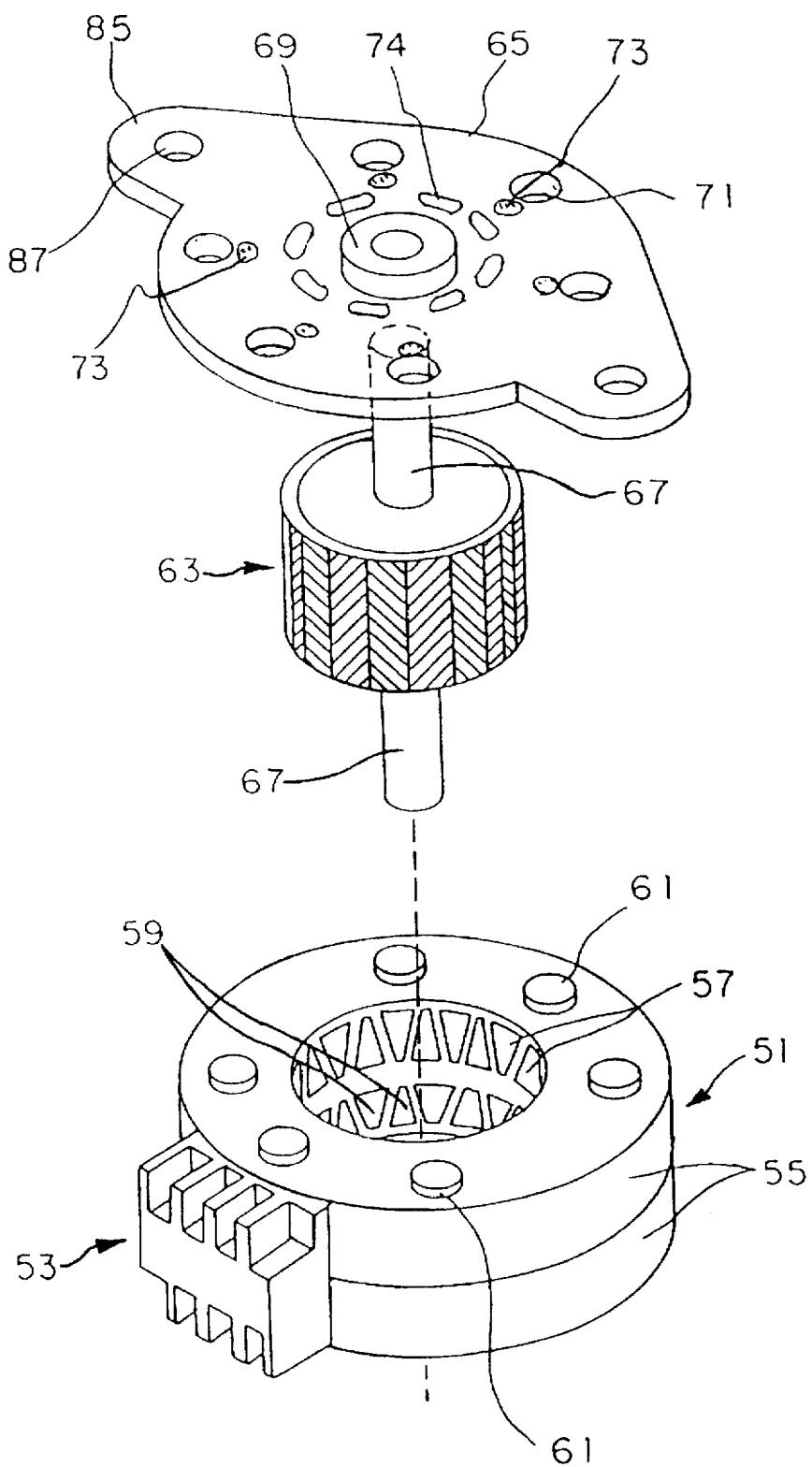
FIG. 6 is an exploded perspective view of a prior art.
Figure 7:
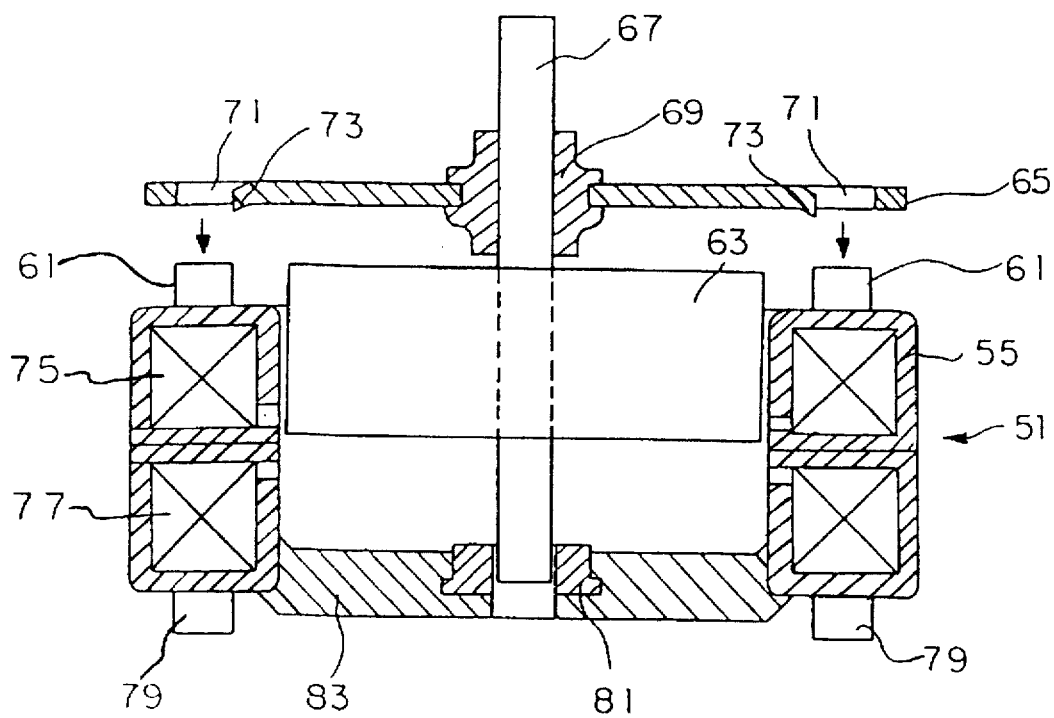
FIG. 7 is an exploded cross sectional view of the prior art.
Figure 8:
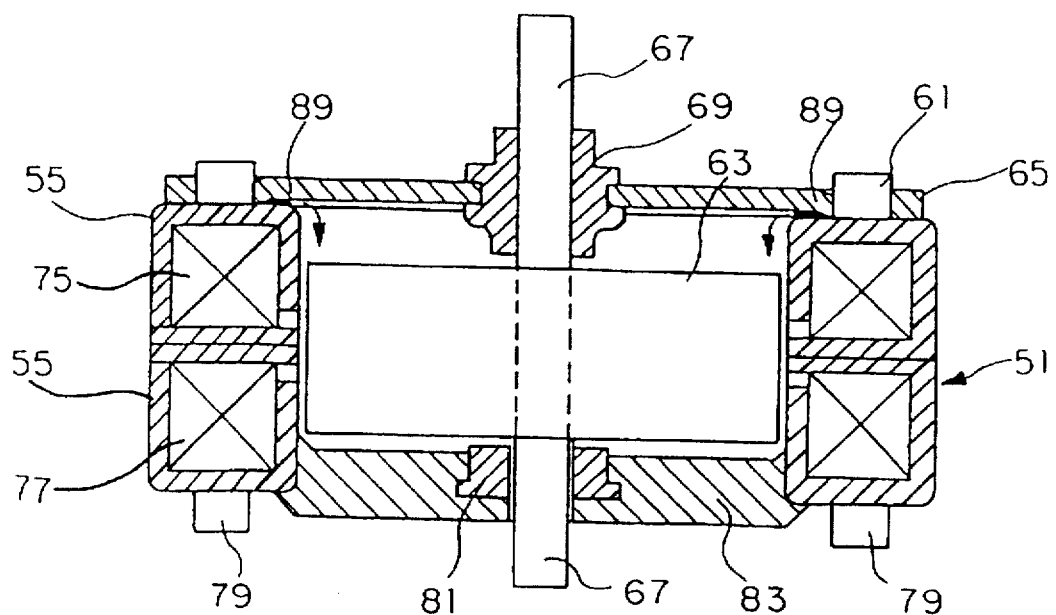
FIG. 8 is a cross sectional view of the prior art.

As shown in FIG. 5, the slots 17 for removal of unwanted metal particles are arranged on the yoke 55 although they are on the end plate 10 outwardly of the positioning apertures 71 in the previous embodiment. It is understood that the present invention is applicable not only to the stepping motors but also to other small-sized motors and generators.

As set forth above, the stator structure in an electrical rotating machine which has a stator to one end of which an end plate provided with a bearing is fixedly mounted and a rotor rotatably supported by the bearing, according to the present invention is provided in that the positioning protrusions are formed extending axially from the one end of the stator, the positioning apertures are provided in the end plate for corresponding to and engaging with the positioning protrusions, and the welding projections to be melted by the resistance welding are arranged substantially on their respective straight lines extending from the center of rotation across the positioning protrusions and on the outer side of the positioning protrusions. Accordingly, unwanted metal particles produced during the resistance welding of the end plate to the stator are blocked by the positioning protrusions and will hardly flow towards the rotor. This allows the stator assembly to be free from such traditional disadvantages as sneaking of metal particles into a clearance between the stator magnetic poles and the rotor which may result in generation of noise and interruption of the rotation.

What is claimed is:

1. An electrical rotating machine, comprising:

a stator;

positioning protrusions extending from one end of said stator;

an end plate having positioning apertures engaged to said positioning protrusions and fixed to one end of said stator by resistance welding at a welding point, each said welding point being located substantially on a straight line extending from a center of rotation across said positioning protrusion and outer side of said positioning protrusion;

a rotor rotatably supported by bearings mounted on said end plate; and slits for removal of metal particles are provided substantially along each said straight line extending from a center of rotation across said positioning protrusion and an outer side of said positioning protrusion.

2. An electrical rotating machine according to claim 1, wherein said slits for removal of metal particles are arranged in said end plate.

3. An electrical rotating machine according to claim 1, wherein said slits for removal of metal particles are arranged in said stator.

4. An end plate for use in an electrical rotating machine, comprising:

positioning apertures for engagement to positioning protrusions of a stator;

welding projections for resistance welding, each said welding projection being located substantially on a straight line extending from center bearing of rotation across said positioning aperture and disposed on an outer circumferential side of said positioning aperture; and slits formed in a lower side of said end plate.

5. A stator for use in an electrical rotating machine, comprising:

positioning protrusions for engagement to positioning apertures of an end plate;

a plurality of welding projections for resistance welding, each said welding projection being located substantially on a straight line extending from a rotating shaft across said positioning protrusion and an outer side of said positioning aperture; and slits formed in an upper side of said stator.

* * * * *